(12) United States Patent
Hong

(10) Patent No.: US 6,359,927 B1
(45) Date of Patent: Mar. 19, 2002

(54) METHOD AND APPARATUS FOR ALLOCATING A BANDWIDTH OF A VIDEO SIGNAL HAVING VARIABLE BIT RATES

(75) Inventor: Seung-Hoon Hong, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/116,818

(22) Filed: Jul. 17, 1998

(30) Foreign Application Priority Data

Oct. 24, 1997 (KR) ............................................. 97-54817

(51) Int. Cl.[7] ................................................. H04N 7/12
(52) U.S. Cl. ............................... 375/240.02; 375/240.26
(58) Field of Search ....................... 375/240.02, 240.12, 375/240.13, 240.26; 348/404.1, 424.2; 382/248, 249; H04N 7/12

(56) References Cited

U.S. PATENT DOCUMENTS

| 5,515,377 | A |   | 5/1996 | Horne et al. ........... 375/240.12 |
| 5,870,146 | A | * | 2/1999 | Zhu ....................... 375/240.03 |
| 6,256,351 | B1 | * | 7/2001 | Hong ..................... 375/240.26 |

FOREIGN PATENT DOCUMENTS

EP           0723345           7/1996

* cited by examiner

Primary Examiner—Nhon T Diep
(74) Attorney, Agent, or Firm—Pennie & Edmonds LLP

(57) ABSTRACT

A method and apparatus for allocating a bandwidth to bit streams of a video signal having variable bit rates, wherein the bit streams are transmitted to an ATM(asynchronous transfer mode) network, encodes the video signal to thereby generate the bit streams of the encoded video signal. Then, a bit function B(i) of the bit streams is generated, wherein the bit function B(i) represents the amount of bits per predetermined ith unit in the bit streams, i being an index of the predetermined unit ranging from 1 to N and N being an integer larger than 1 and fractal surface areas $A_j$'s based on the bit function B(i) are iteratively calculated, j being an integer ranging from 1 to M and M being an integer larger than 1. Thereafter, an intermediate parameter I by using the fractal surface areas $A_j$'s is determined and a Hurst parameter H is evaluated based on the intermediate parameter I. Based on the Hurst parameter H, a bandwidth is allocated to the bit streams and the bit streams are transmitted based on the allocated bandwidth.

13 Claims, 5 Drawing Sheets

METHOD AND APPARATUS FOR ALLOCATING A BANDWIDTH OF A VIDEO SIGNAL HAVING VARIABLE BIT RATES

FIELD OF THE INVENTION

The present invention relates to a method and apparatus for allocating a bandwidth of a video signal having variable bit rates; and, more particularly, to a method and apparatus for determining a bandwidth of a video signal based on the fractal surface areas thereof.

DESCRIPTION OF THE PRIOR ART

With the recent availability of large data sets of actual VBR(variable bit rate) video traffic measurements, the inherent features of the VBR video traffic, i.e., the features which are independent of scene and codec, have become one of the major topics in the traffic engineering for high-speed networks. The idea of utilizing the inherent features of the VBR video traffic may make it possible to move away from the models that are highly dependent on the scene and/or codec specifics toward a more universal description of the VBR video traffic.

The transport of VBR video images from such applications as video conference, video telephone, and full motion broadcast and studio quality video is expected to become a major traffic component of the networks. In order for these networks to meet the stringent performance criteria required for the VBR services and to provide efficient multimedia communications, the use of the ATM(asynchronous transfer mode) technique has been proposed.

In the ATM technique, a bandwidth is allocated to the VBR video traffic based on the inherent features characterizing of the VBR video traffic. One of the inherent features is a Hurst parameter representing the characteristics of the VBR video traffic(see, e.g., J. Beran et al., "Long-Range Dependence in Variable-Bit-Rate Video Traffic", *IEEE Trans. on Commun.*, Vol. 43, No. 2/3/4, pp. 1566–1579, 1995), wherein the Hurst parameter is calculated by using a rescaled adjusted range statistics or, for short, R/S statistics.

Assuming observations or sequences $X_k$'s of video data having N frames, N being a positive integer and k being an integer ranging from 1 to N and $X_k$ representing the number of encoded bits for a kth frame of the video signal, the sample mean and the sample variance of the sequences $X_k$'s are XM(N) and $S^2$(N), respectively, the R/S statistics of the sequences $X_k$'s may be defined as:

$$\frac{R(N)}{S(N)} = \frac{[\max(0, W_1, W_2, \cdots, W_N) - \min(0, W_1, W_2, \cdots, W_N)]}{S} \quad \text{Eq. (1)}$$

wherein, $W_k=(X_1+X_2+\cdots+X_k)-k\cdot X_m(N)$.

And, the expectation of R(N)/S(N) may be given by:

$$E\left[\frac{R(N)}{S(N)}\right] \approx C \cdot N^H, \text{ as } N \to \infty \quad \text{Eq. (2)}$$

wherein C is a constant and H is a Hurst parameter. The Hurst parameter is calculated based on Eqs.(1) and (2).

In practice, R/S analysis is based on a heuristic graphical approach. Formally, given a sample of N observations $X_k$'s, the entire samples are subdivided into K non-overlapping blocks, K being a positive integer smaller than N, and the rescaled adjusted range $R(t_i,d)/S(t_i,d)$ for each of new starting points is computed, wherein the new starting points are $t_1=1$, $t_2=(N/K)+1$, $t_3=(2N/K)+1$, $\cdots$, $t_K=\{(K-1)\cdot N/K\}+1$ and satisfy $(t_K-1)+d \leq N$. Here, $R(t_i, d)$ is defined as in Eq. (1) with $Wk$ replaced by $W_{ti+k}-W_{ti}$ and $S^2(t_i, d)$ is the sample variance of $X_{ti+1}, X_{ti+2}, \cdots, X_{ti+d}$. Thus, for a given value of d, as many as K samples of R/S are obtained when d is small and as few as one sample is obtained when d is close to the total sample size N.

Next, logarithmically spaced values of d, starting with $d \approx 10$, are taken. Plotting $\log\{R(t_i,d)/S(t_i,d)\}$ versus $\log(d)$ results in a rescaled adjusted range plot. When the Hurst parameter H is defined, a typical rescaled adjusted range plot starts with a transient zone representing the short range dependence in the sample, but will eventually settle down and fluctuate along a straight street of slope H. A graphical R/S analysis is used to determine whether such an asymptotic behavior is supported by the data; and if it is affirmative, the asymptotic value of the Hurst exponent H is estimated usually by simple least square fit, wherein the value of the Hurst exponent H asymptotically approaches to the value of the street's slope.

Thereafter, the VBR video traffic is classified into roughly 3 categories, i.e., low-, medium-, and high-activity, based on the values of the corresponding empirical Hurst parameter. If the Hurst parameter lies between 0.5 and 0.75, the VBR video traffic corresponds to the low-activity category; if the Hurst parameter greater than 0.75 and smaller than 0.9, the VBR video traffic belongs to the medium-activity category; and if the Hurst parameter gets close to 1, the VBR video traffic falls in the high-activity category. Based on the classification, the VBR video traffic is allocated with a corresponding bandwidth and is transmitted to the ATM network by using the allocated bandwidth.

In the conventional R/S analysis scheme described above, the Hurst parameter is calculated by using the sample mean and the sample variance. Furthermore, the multiplication and divisional computations exalt a lengthy computation time. Thus, there has existed a need to develop a simpler scheme to compute the Hurst parameter.

SUMMARY OF THE INVENTION

It is, therefore, a primary object of the invention to provide a more efficient method and apparatus for determining a hurst parameter of a video signal having variable bit rates by using the fractal surface areas thereof.

In accordance with one aspect of the present invention, there is provided a method for allocating a bandwidth to bit streams of a video signal having variable bit rates, wherein the bit streams are transmitted to an ATM(asynchronous transfer mode) network, comprising the steps of: (a) encoding the video signal to thereby generate the bit streams of the encoded video signal; (b) generating a bit function B(i) of the bit streams, wherein the bit function represents the amount of bits per predetermined ith unit in the bit streams, i being an index of the predetermined unit ranging from 1 to N and N being an integer larger than 1; (c) iteratively calculating fractal surface areas $A_j$'s based on the bit function B(i), wherein j is an integer ranging from 1 to M and M is an integer larger than 1; (d) determining an intermediate parameter I by using the fractal surface areas $A_j$'s; (e) evaluating a Hurst parameter H based on the fractal surface areas; (f) allocating a bandwidth to the bit streams based on the Hurst parameter H; and (g) transmitting the bit streams to the ATM network based on the allocated bandwidth.

In accordance with another aspect of the present invention, there is provided an apparatus for allocating a bandwidth to bit streams of a video signal having variable bit rates, wherein the bit streams are transmitted to an ATM network, comprising: means for encoding the video signal to thereby generate the bit streams of the encoded video signal; means for generating a bit function B(i) of the bit streams, wherein the bit function represents the amount of bits per predetermined ith unit in the bit streams, i being an index of the predetermined unit ranging from 1 to N and N being an integer larger than 1; means for iteratively calculating fractal surface areas $A_j$'s based on the bit function B(i), wherein j is an integer ranging from 1 to M and M is an integer larger than 1; means for determining an intermediate parameter I by using the fractal surface areas $A_j$'s; means for evaluating a Hurst parameter H based on the fractal surface areas; means for allocating a bandwidth to the bit streams based on the Hurst parameter H; means for storing the bit streams; and means for transmitting the stored bit streams to the ATM network based on the allocated bandwidth.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
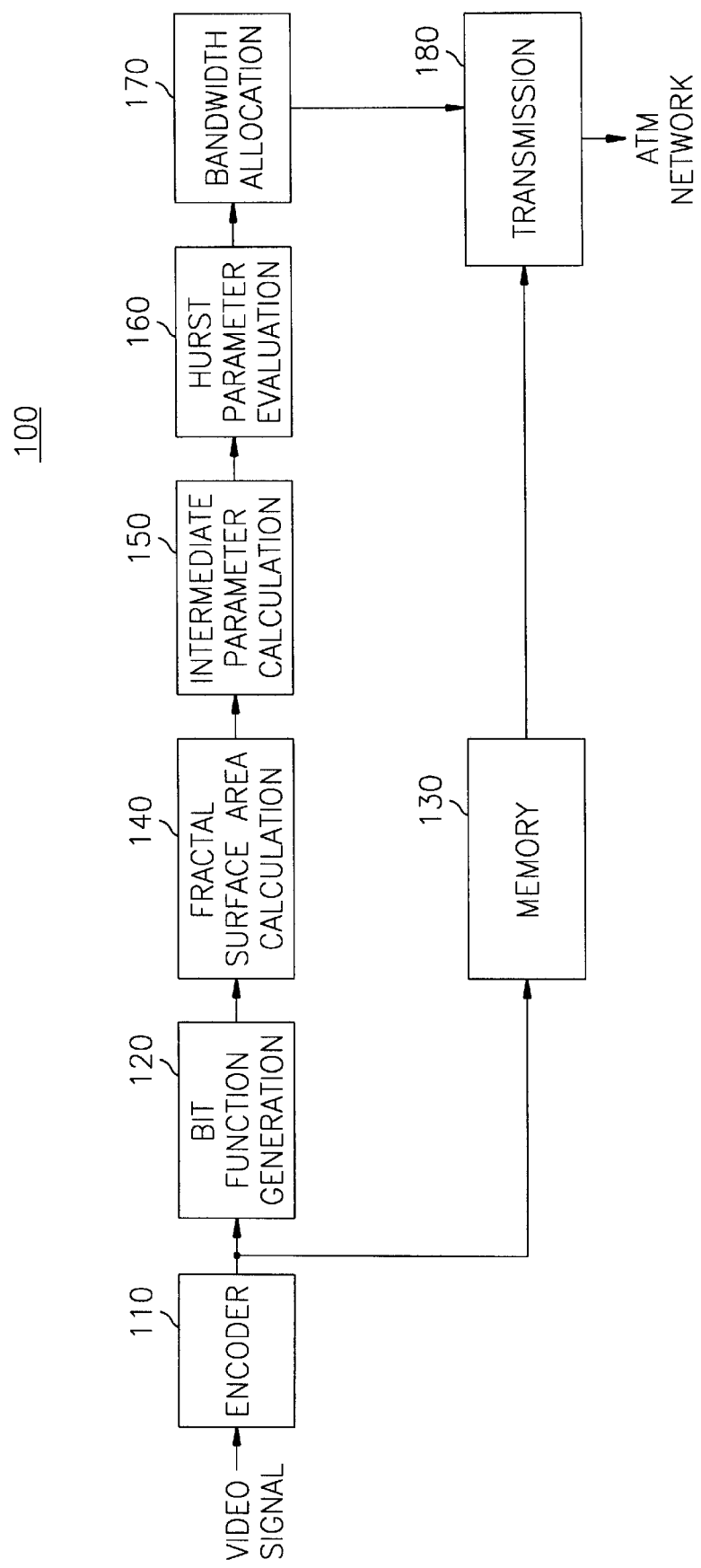
FIG. 1 depicts an apparatus for allocating a bandwidth of a video signal having variable bit rates in accordance with a preferred embodiment of the present invention.

Referring to FIG. 1, there is depicted an apparatus 100 for allocating a bandwidth of a video signal having variable bit rates in accordance with a preferred embodiment of the present invention. The video signal is compressed and encoded by an encoder 110 based on, e.g., the so-called MPEG(moving picture expert group) -II scheme. Bit streams containing data of the encoded video signal are provided from the encoder 110 to a bit function generation block 120 and a memory 130.

The bit function generation block 120 detects the amount of encoded bits per predetermined unit, e.g., frame or macroblock, to thereby generate a bit function B(i) of the bit streams, wherein i is an index of the predetermined unit ranging from 1 to M, with M being an integer larger than 1 and the bit function B(i) represents the number of encoded bits of an ith unit. In accordance with a preferred embodiment of the present invention, the predetermined unit is an I-picture in the bit streams.

Typical bit streams contain a mix of I-, P- and B-pictures. The I-pictures are intra coded pictures which are coded without reference to any other pictures; the P-pictures are predictive coded pictures which are coded by using motion compensation from a previous I- or P-picture; and the B-pictures are bidirectionally predictive coded pictures which are coded by using motion compensation from a previous and a future pictures of the I- or P-types. Since the amounts of bits of the I-pictures are dominant over those of the other pictures in the bit streams, a Hurst parameter determined based on the I-pictures can be a measure of the characteristics of the whole bit streams. By considering I-pictures only, the computational complexity can be reduced.

Figure 2:
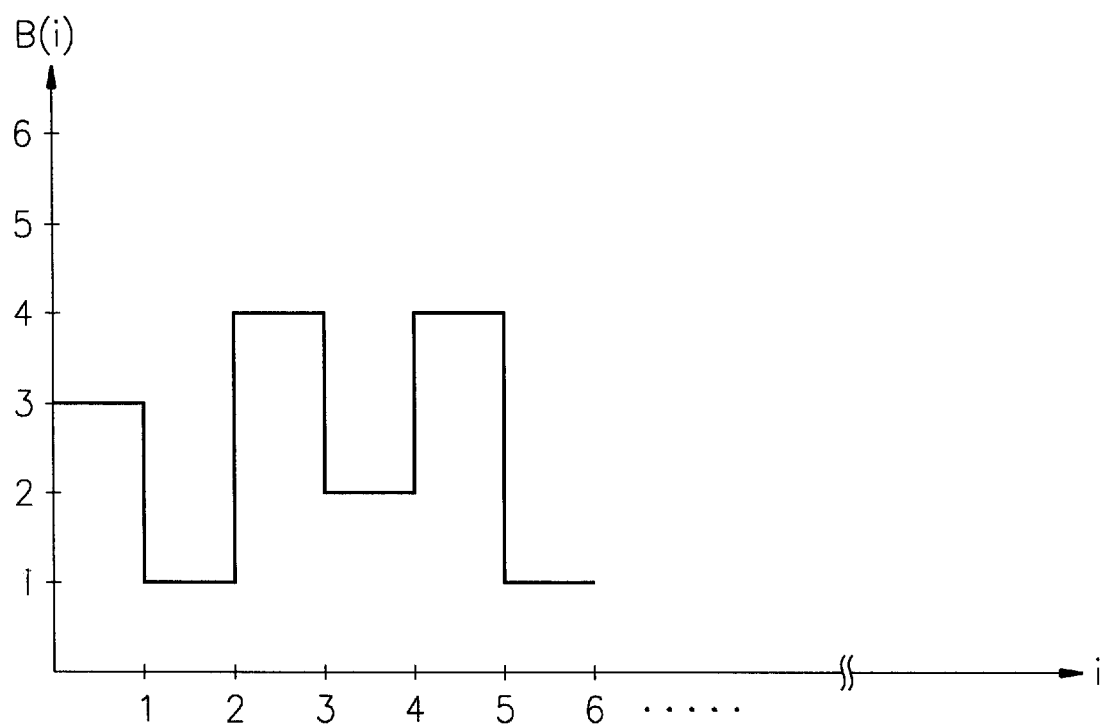
FIG. 2 is a graphical illustration of a bit function B(i) versus i representing the amount of bits of an ith frame in the video signal.

Referring to FIG. 2, a graphical illustration of the bit function B(i) versus ith I-picture in the bit streams is depicted, wherein the unit of the bit function B(i) is omitted for the sake of simplicity. The bit function generation block 120 provides the bit function B(i) to a fractal surface area calculation block 140.

The fractal surface area calculation block 140 iteratively calculates an upper envelope function $U_j(i)$ and a lower envelope function $L_j(i)$, wherein $U_j(i)$ and $L_j(i)$ represent an upper and a lower envelope functions of jth iteration for B(i), with j being an integer ranging from 1 to N and N being an integer larger than 1. The upper and the lower envelope functions are calculated by:

$$U_j(i) = \max\ [U_{j-1}(i-1),\ U_{j-1}(i)+\alpha,\ U_{j-1}(i+1)] \qquad \text{Eq.(3)}$$

$$L_j(i) = \min\ [L_{j-1}(i-1),\ L_{j-1}(i)-\alpha,\ L_{j+1}(i+1)] \qquad \text{Eq.(4)}$$

wherein $U_0(i) = L_0(i) = B(i)$, $U_j(0) = L_j(0) = 0$ and $\alpha$ is a predetermined constant having a value about 10% of the average value of the bit function B(i).

Assume that values of the bit function B(i) with respect to an ith I-picture are 3, 1, 4, 2, 4, and 1 (arbitrary-unit), with i ranging from 1 to 6, as shown in FIG. 2 and that the value of $\alpha$ is 2. Then, a first upper envelope function $U_1(i)$ is calculated as follows:

$$U_1(1) = \max[U_0(0),\ U_0(1)+2,U_0(2)] = \max[0, 5, 1] = 5;$$

$$U_1(2) = \max[U_0(1),\ U_0(2)+2,U_0(3)] = \max[3, 3, 4] = 4;$$

$$U_1(3) = \max[U_0(2),\ U_0(3)+2,U_0(4)] = \max[1, 6, 2] = 6;$$

$$U_1(4) = \max[U_0(3),\ U_0(4)+2,U_0(5)] = \max[4, 4, 4] = 4;$$

and $$U_1(5) = \max[U_0(4),\ U_0(5)+2,U_0(6)] = \max[2, 6, 1] = 6.$$

And, a first lower envelope function $L_1(i)$ is calculated as follows:

$$L_1(1) = \min[L_0(0),\ L_0(1)-2,L_0(2)] = \min[0, 1, 1] = 0;$$

$$L_1(2) = \min[L_0(1),\ L_0(2)-2,L_0(3)] = \min[3, -1, 4] = 1;$$

$$L_1(3) = \min[L_0(2),\ L_0(3)-2,L_0(4)] = \min[1, 2, 2] = 1;$$

$$L_1(4) = \min[L_0(3),\ L_0(4)-2,L_0(5)] = \min[4, 0, 4] = 0;$$

and $$L_1(5) = \min[L_0(4),\ L_0(5)-2,L_0(6)] = \min[2, 2, 1] = 1.$$

Figure 3:
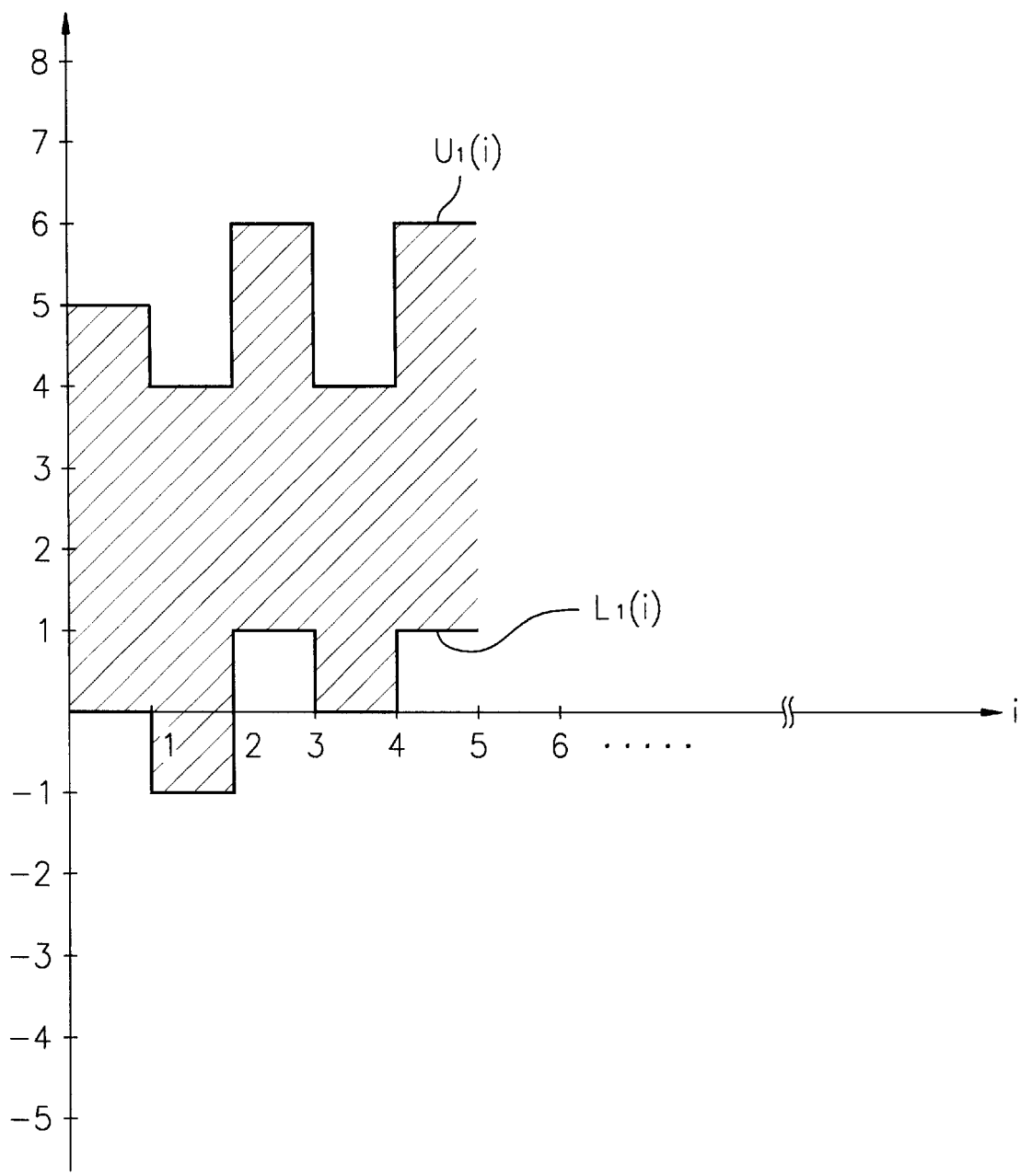
FIGS. 3 and 4 present exemplary fractal surface areas of the video signal calculated based on the bit function B(i)

The first upper and the lower envelope functions $U_1(i)$ and $L_1(i)$ are illustrated in FIG. 3.

Based on the first upper envelope function $U_1(i)$, a second upper envelope function $U_2(i)$ is calculated as follows:

$$U_2(1) = \max[U_1(0),\ U_1(1)+2,U_1(2)] = \max[0, 7, 4] = 7;$$

$$U_2(2) = \max[U_1(1),\ U_1(2)+2,U_1(3)] = \max[5, 6, 6] = 6;$$

$$U_2(3) = \max[U_1(2),\ U_1(3)+2,U_1(4)] = \max[4, 8, 4] = 8;$$

and $$U_2(4) = \max[U_1(3),\ U_1(4)+2,U_1(5)] = \max[6, 6, 6] = 6.$$

Figure 4:
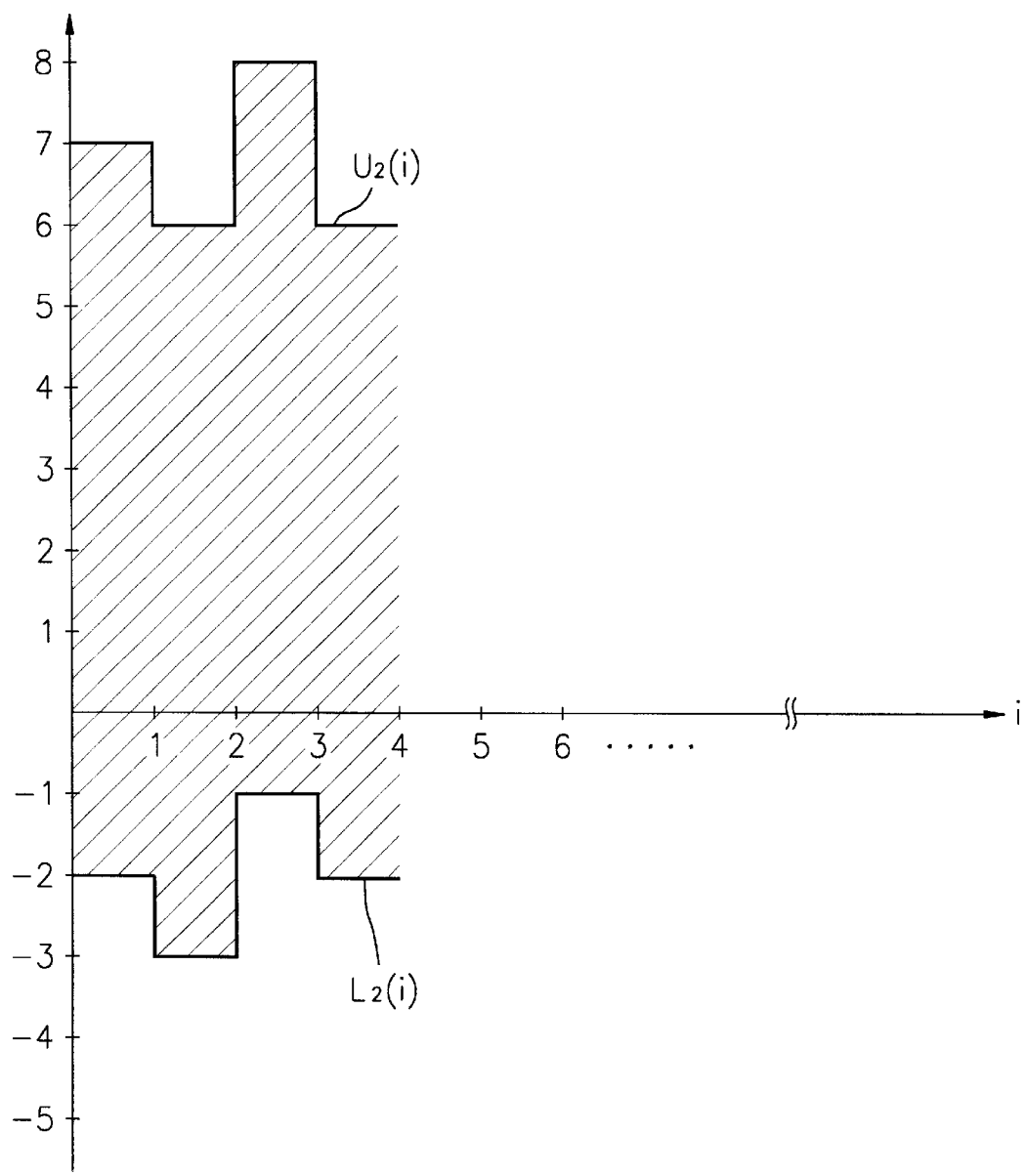

And, based on the first lower envelope function $L_1(i)$, a second lower envelope function $L_2(i)$ is calculated as follows:

$L_2(1)=\min[L_1(0), L_1(1)-2, L_1(2)]=\min[0, -2, -1]=-2;$ $L_2(2)=\min[L_1(1), L_1(2)-2, L_1(3)]=\min[0, -3, 1]=-3;$ $L_2(3)=\min[L_1(2), L_1(3)-2, L_1(4)]=\min[-1, -1, 0]=-1;$ and $L_2(4)=\min[L_1(3), L_1(4)-2, L_1(5)]=\min[-1, -2, 1]=-2.$ The second upper and the lower envelope functions $U_2(i)$ and $L_2(i)$ are illustrated in FIG. 4

In this way, N number of upper envelope functions and N number of lower envelope functions, i.e. $U_1(i)$ to $U_N(i)$ and $L_1(i)$ to $L_N(i)$ are calculated after N iterations.

Thereafter, the fractal surface area calculation block 140 calculates fractal surface areas $A_j$'s based on the $U_1(i)$ to $U_N(i)$ and $L_1(i)$ to $L_N(i)$. The jth fractal surface area $A_j$ is given by:

$$A_j = \sum_{i=1}^{M} [U_j(i) - L_j(i)]. \quad \text{Eq. (5)}$$

The shaded area between $U_1$ and $L_1$ shown in FIG. 3 is the $A_1$ and the shaded area between $U_2$ and $L_2$ shown in FIG. 4 is the $A_2$. The fractal surface area $A_j$ converges into a value as the value of j increases. Considering the computational complexity and the converged value, the value of j is appropriately set. The calculated fractal surface areas $A_1$ to $A_M$ are provided from the fractal surface area calculation block 140 to an intermediate parameter calculation block 150.

Figure 5:
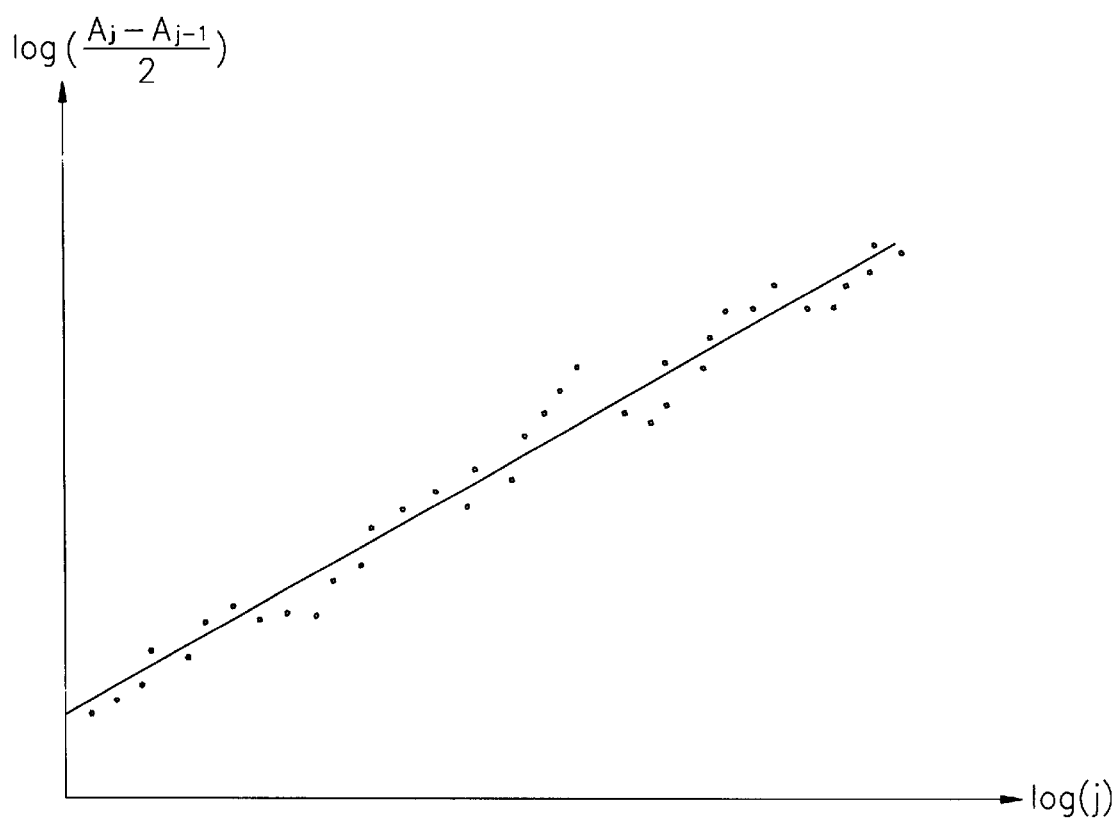
FIG. 5 shows a logarithmical description of $\log\{(A_j - A_{j-1})/2\}$ versus log(j) and its asymptotic line.

The intermediate parameter calculation block 150 calculates an intermediate parameter I based on $A_1$ to $A_M$ provided from the fractal surface area calculation block 140 by using the following equation:

$$\frac{(A_j - A_{j-1})}{2} = F \cdot j^{2-I} \quad \text{Eq. (6)}$$

wherein $A_0$ is 0 and F is a constant. If a logarithmic function is applied on both sides of the Eq. (6),, (2-I) becomes a slope of a line representing $\log\{(A_j - A_{j-1})/2\}$ versus $\log(j)$. FIG. 5 represents a graphical method to determine the intermediate parameter I. In FIG. 5, dots correspond to $\log\{(A_j - A_{j-1})/2\}$ versus $\log(j)$ and a line is fitted to the dots as an asymptotic line, wherein the slope of the asymptotic line corresponds to (2-I).

The intermediate parameter calculation block 150 provides the calculated intermediate parameter I to a Hurst parameter evaluation block 160. The Hurst parameter evaluation block 160 evaluates a Hurst parameter H based on the following equation:

$$H = \rho + 1 - I \quad \text{Eq.(7)}$$

wherein $\rho$ is a preset constant. The calculated Hurst parameter H is applied to a bandwidth allocation block 170.

The bandwidth allocation block 170 classifies a traffic characteristic of the bit streams provided from the encoder by using the Hurst parameter H to thereby allocate a bandwidth to the bit streams based thereon. If the Hurst parameters H lies between 0.5 and 0.75, the traffic of the bit streams corresponds to the low-activity; if the Hurst parameter H lies between 0.75 and 0.9, the traffic of the bit streams corresponds to the medium-activity; and if the Hurst parameter H goes close to 1, the traffic of the bit streams corresponds to the high-activity. Based on the classified activity, the bit streams are allocated with a corresponding bandwidth and are transmitted to an ATM network. That is, to bit streams having a larger Hurst parameter, a wider bandwidth is allocated. The determined bandwidth is applied to a transmission block 180.

Meanwhile, the bit streams stored at the memory 130 is provided to the transmission block 180. The transmission block 180 transmits the bit streams to the ATM network based on the bandwidth determined at the bandwidth allocation block 170.

Thus, in accordance with the present invention, a Hurst parameter is simply determined by using fractal surfaces to thereby efficiently allocate a bandwidth to bit streams of an encoded video signal.

While the present invention has been described with respect to certain preferred embodiments only, other modifications and variations may be made without departing from the spirit and scope of the present invention as set forth in the following claims.

What is claimed is:

1. A method for allocating a bandwidth to bit streams of a video signal having variable bit rates, wherein the bit streams are transmitted to an ATM(asynchronous transfer mode) network, comprising the steps of:

(a) encoding the video signal to thereby generate the bit streams of the encoded video signal;

(b) generating a bit function B(i) of the bit streams, wherein the bit function B(i) represents the amount of bits per predetermined ith unit in the bit streams, i being an index of the predetermined unit ranging from 1 to N and N being an integer larger than 1;

(c) iteratively calculating fractal surface areas $A_j$'s based on the bit function B(i), wherein j is an integer ranging from 1 to M and M is an integer larger than 1;

(d) determining an intermediate parameter I by using the fractal surface areas $A_j$'s;

(e) evaluating a Hurst parameter H based on the intermediate parameter I;

(f) allocating a bandwidth to the bit streams based on the Hurst parameter H; and (g) transmitting the bit streams based on the allocated bandwidth.

2. The method of claim 1, wherein said step (c) includes the steps of:

(c1) iteratively calculating an upper envelope function $U_j$ and a lower envelope function $L_j$ by using the following equations:

$U_j(i) = \max[U_{j-1}(i-1), U_{j-1}(i)+\alpha, U_{j-1}(i+1)]$ $L_j(i) = \min[L_{j-1}(i-1), L_{j-1}(i)-\alpha, L_{j+1}(i+1)]$ wherein $\alpha$ is a predetermined constant having a value of about 10% of the average function value of the bit function B(i), $U_0(i)=L_0(i)=B(i)$ and $U_j(0)=L_j(0)=0$; and (c2) iteratively calculating a fractal surface area $A_j$ by detecting an area between $L_j(i)$ and $U_j(i)$.

3. The method of claim 2, wherein the intermediate parameter I is determined at said step (d) by using the following equation.

$$\frac{(A_j - A_{j-1})}{2} = F \cdot j^{2-I}.$$

4. The method of claim 3, wherein said step (d) includes the steps of:
   (d1) taking a logarithm on both sides of the equation recited in claim 3 to generate the following equation:

$$\log\frac{(A_j - A_{j-1})}{2} = \log(F) + (2 - I) \cdot \log(j);$$

(d2) representing, by using dots, the value of the left side of the generated equation based on the calculated fractal surface areas $A_j$'s;
   (d3) determining an asymptotic line of the dots of the step (d2);
   (d4) detecting a slope of the asymptotic line; and
   (d5) determining the intermediate parameter I by using the slope of the asymptotic line.

5. The method of claim 4, wherein the Hurst parameter H is evaluated by using the following equation:

$$H=\rho+1=I$$

wherein $\rho$ is a preset constant.

6. The method of claim 5, wherein said step (g) includes the step of:
   (g1) storing the bit streams; and
   (g2) providing the stored bit streams to the ATM network based on the bandwidth allocated at the step (f).

7. The method of claim 6, wherein the predetermined unit of the step (b) is an I-picture in the bit streams.

8. An apparatus for allocating a bandwidth to bit streams of a video signal having variable bit rates, wherein the bit streams are transmitted to an ATM(asynchronous transfer mode) network, comprising:
   means for encoding the video signal to thereby generate the bit streams of the encoded video signal;
   means for generating a bit function B(i) of the bit streams, wherein the bit function B(i) represents the amount of bits per predetermined ith unit in the bit streams, i being an index of the predetermined unit ranging from 1 to N and N being an integer larger than 1;
   means for iteratively calculating fractal surface areas $A_j$'s based on the bit function B(i), wherein j is an integer ranging from 1 to M and M is an integer larger than 1;
   means for determining an intermediate parameter I by using the fractal surface areas $A_j$'s;
   means for evaluating a Hurst parameter H based on the intermediate parameter I;
   means for allocating a bandwidth to the bit streams based on the Hurst parameter H;
   means for storing the bit streams; and
   means for transmitting the stored bit streams based on the allocated bandwidth.

9. The apparatus of claim 8, wherein the fractal surface areas calculating means includes:
   means for iteratively calculating an upper envelope function $U_j$ and a lower envelope function $L_j$ by using the following equations:

$$U_j(i) = \max[U_{j-1}(i-1), U_{j-1}(i)+\alpha, U_{j-1}(i+1)]$$

$$L_j(i) = \min[L_{j-1}(i-1), L_{j-1}(i)-\alpha, L_{j-1}(i+1)]$$

wherein $\alpha$ is a predetermined constant having a value of about 10% of the average function value of the bit function B(i), $U_0(i)=L_0(i)=B(i)$ and $U_j(0)=L_j(0)=0$; and
   means for iteratively calculating a fractal surface area $A_j$ by detecting an area between $L_j(i)$ and $U_j(i)$.

10. The apparatus of claim 9, wherein the intermediate parameter I is determined at the intermediate parameter determining means by using the following equation:

$$\frac{(A_j - A_{j-1})}{2} = F \cdot j^{2-I}.$$

11. The apparatus of claim 10, wherein the intermediate parameter determining means includes:
    means for taking a logarithm on both sides of the equation recited in claim 10 to generate the following equation:

$$\log\frac{(A_j - A_{j-1})}{2} = \log(F) + (2 - I) \cdot \log(j);$$

means for representing, by using dots, the value of the left side of the generated equation based on the calculated fractal surface areas $A_j$'s;
    means for determining an asymptotic line of the dots of the representing means;
    means for detecting a slope of the asymptotic line; and
    means for determining the intermediate parameter I by using the slope of the asymptotic line.

12. The apparatus of claim 11, wherein the Hurst parameter H is evaluated by using the following equation:

$$H=\rho+1-I$$

wherein $\rho$ is a preset constant.

13. The apparatus of claim 12, wherein the predetermined unit of the bit function generating means is an I-picture in the bit streams.

* * * * *